United States Patent [19]

Tanifuji et al.

[11] 4,255,133
[45] Mar. 10, 1981

[54] METHOD FOR CONTROLLING FURNACE TEMPERATURE OF MULTI-ZONE HEATING FURNACE

[75] Inventors: Shinya Tanifuji; Yasuo Morooka, both of Hitachi, Japan

[73] Assignee: Hitachi, Ltd., Tokyo, Japan

[21] Appl. No.: 28,705

[22] Filed: Apr. 10, 1979

[30] Foreign Application Priority Data

Apr. 10, 1978 [JP] Japan ................................ 53/41185
Aug. 28, 1978 [JP] Japan .............................. 53/103938

[51] Int. Cl.³ .............................................. F27D 7/00
[52] U.S. Cl. ...................................... 432/24; 266/80; 266/90; 432/36
[58] Field of Search ..................... 432/9, 24, 36, 54; 266/80, 87, 90; 364/110, 477

[56]    References Cited
U.S. PATENT DOCUMENTS 3,604,695  9/1971  Steeper ................................ 266/80

FOREIGN PATENT DOCUMENTS

1439456  6/1976  United Kingdom ...................... 432/36

*Primary Examiner*—John J. Camby
*Attorney, Agent, or Firm*—Craig and Antonelli

[57] ABSTRACT

A method for controlling furnace temperatures of a multi-zone heating furnace having a feedback control system for detecting and inputting a furnace temperature and a furnace temperature setting device or a combustion control computer of the type for determining an optimum furnace temperature for each slab and outputting it as a set point to said feedback control system, the method comprising the steps of determining, under predetermined limit conditions which are required for the operations of the furnace, a furnace temperature pattern or a slab temperature rise curve which may minimize the overall flow rate of fuel, heating the furnace along the furnace temperature pattern or the slab temperature rise curve which is determined, reducing, in response to the instruction for suspending the discharge of slabs from the furnace, the flow rate of fuel to be supplied to the furnace to a predetermined level, and heating the furnace along a new slab temperature rise curve which is obtained by shifting the steady state slab temperature rise curve by a slab discharge suspension period, thereby making the slab temperature when the slab discharge is resumed equal to the slab temperature when the slab discharge suspension instruction is received.

11 Claims, 12 Drawing Figures

METHOD FOR CONTROLLING FURNACE TEMPERATURE OF MULTI-ZONE HEATING FURNACE

BACKGROUND OF THE INVENTION

The present invention relates to a method for controlling the furnace temperature of a multi-zone heating furnace for heating metallic steel slabs or the like.

So far the setting on a furnace temperature control device has been so far made in general by the manual setting by an operator, and as a set point the value which was obtained from the experiences in operations of furnaces has been used. When the furnace temperature is set, firstly it is required that the average slab temperature is within a desired range when a slab is discharged, and secondly the slab must be heated in such a way that the temperature difference between the surfaces and interior of the slab may become minimum. The means which most simply satisfies these demands is considered to heat the slab as rapidly as possible in the initial stage of heating and thereafter soaking the slab at a substantially constant temperature. With the prior art manual operations, it has been difficult to switch finely the furnace temperature set points in response to the conditions of rolling lines so that there has been a tendency for using the simple furnace temperature setting of the type described above. However, this method has a defect that the furnace temperature set point becomes higher as a whole, thus resulting in the increase in a fuel unit.

Recently in view of energy savings, there has been proposed a method for using a computer for determining an optimum furnace temperature set point in response to the distribution of slabs in the furnace and automatically setting this set point. As a result, it has become possible to use the relationship between the furnace temperature and the slab temperatures as a heating model, thereby predicting the heating conditions of slabs. Thus the accuracy with which the slab discharge temperature is controlled has been improved.

For instance, Japanese Patent Application Kokai No. 52-117818 proposes a method wherein the furnace temperature in each heating zone is assumed, the loss of heat of the furnace and the deviation of a predicted discharge temperature of a slab from a set discharge temperature at said assumed furnace temperature are obtained, and the furnace temperature in each heating zone is so determined and set that the sum of the product of said thermal loss and a first coefficient and the product of the square of said deviation and a second coefficient may become minimum.

The prior art methods described above are common in that the relationship between the furnace temperature and slab temperature is used. However, the relationship between the furnace temperature and fuel flow rate has not been directly considered. No consideration has been given to whether the furnace temperature pattern which is obtained can minimize the fuel. Meanwhile, a rolling line for rolling heated metallic steel workpieces or slabs is forced frequently to suspend its operations due to the exchanges of rolling rolls, operation troubles or the like. In this case, when the normal operations continue in the heating furnace, there is a fear that overheating of slabs results in loss of thermal energy. Therefore countermeasures are needed such as lowering the furnace temperature for some period until the resumption of the operations of the rolling line, thereby preventing the slabs from being overheated and contemplating the savings of fuel. Furthermore it is needed to guarantee accuracy of the slab discharge temperature after the resumption of the operations of the rolling line. In one example of the prior art furnace temperature controls in the case of the suspension of the operations of the rolling line, the furnace temperature set point is lowered in such a way that the temperatures of slabs close to the discharge outlet or exit of the furnace may be maintained constant, and prior to the resumption of the discharge of slabs, the furnace temperature is recovered to that when the slab discharge was suspended. With this method, the temperatures of the slabs spaced apart from the outlet of the furnace are deviated from the set points when the slab discharge is resumed, and it takes a time before the furnace temperature control returns to the steady state, resulting in the decrease in productivity. In addition, it is not necessarily true that all conventional heating furnaces have a plurality of zones in which temperatures can be controlled independently of each other. Since temperature control in each zone is not effected, the furnace temperature control in case of the suspension of the operations of the rolling line is not satisfactory.

SUMMARY OF THE INVENTION

One of the objects of the present invention is to set an optimum furnace temperature so as to improve a fuel unit of the furnace.

Another object of the present invention is to provide a method for controlling the zone temperatures in such a way that all the slabs existing in all the zones in the furnace may not be overheated or underheated, thereby improving the slab discharge temperature, avoiding the decrease in productivity and enabling to effect the furnace temperature control adapted to save fuel.

According to a method of the present invention, the overall flow rate of fuel obtained from the heat balance model within a furnace is used as an evaluation function, a furnace temperature pattern for minimizing the evaluation function under the slab discharge conditions and the furnace operation conditions is determined, and this is output as an optimum set point of a furnace temperature control device.

Furthermore according to a method of the present invention, the temperatures of all slabs are computed based upon the detected value of the furnace temperature during the furnace control when the rolling is carried on smoothly the furnace temperature control is so effected that these values correspond to a predetermined temperature rise pattern, and when the rolling operations are suspended, furnace temperature control is so effected that these values may coincide with a suspension pattern which takes into consideration of the slab temperature accuracy for its discharge in the case of the resumption of the slab discharge, whereby the conditions for heating all the slabs in the furnace may be adapted for operations.

DESCRIPTION OF THE PREFERRED EMBODIMENT

Figure 1:
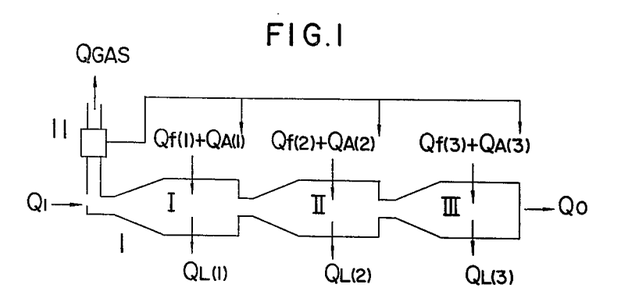
FIG. 1 is a schematic view of a three-zone heating furnace.

The thermal phenomena in a reheat furnace are expressed in terms of the transfer of heat by radiation and convection. The thermal transfer between slabs, flames and furnace walls are governed by heat transfer by radiation, while the thermal transfer due to the flow of gas is governed by the heat transfer by convection. FIG. 1 shows the heat transfer conditions in steady state of a three-zone continuous heat furnace. I is a first zone of the heat furnace; II is a second zone; and III is a third zone. A recuperator 11 functions to preheat air to be charged into the heat furnace 1. $Q_f(1)$, $Q_f(2)$ and $Q_f(3)$ represent heat (Kcal/H) supplied to the first, second and third zones, respectively of the heat furnace; $Q_A(1)$, $Q_A(2)$ and $Q_A(3)$ denote latent heat (Kcal/H) of the air charged into the first, second and third zones, respectively; $Q_L(1)$, $Q_L(2)$ and $Q_L(3)$ indicate thermal losses (Kcal/H) escaping from the furnace walls and skids in the first, second and third zones, respectively; $Q_I$ shows latent heat (Kcal/H) of charged slabs; $Q_o$ is latent heat (Kcal/H) of discharged slab; and $Q_{gas}$ indicates latent heat of exhaust gases in Kcal/H. Eq. (1) is held between them.

$$\sum_{I=1}^{3} (Q_f(I) + Q_A(I) - Q_L(I)) + Q_I - Q_o - Q_{gas} = 0 \tag{1}$$

Let V denote the overall fuel flow rate (Nm³/H). Then $\sum_{I=1}^{3} Q_f(I)$, $\sum_{I=1}^{3} Q_A(I)$ and $Q_{gas}$ are represented by Eqs. (2) ~ (4).

$$\sum_{I=1}^{3} Q_f(I) = V \cdot H_L \tag{2}$$

$$\sum_{I=1}^{3} Q_A(I) = V \cdot A_r \cdot (T_{PRE} - T_R) \cdot C_A \tag{3}$$

$$Q_{gas} = V \cdot \gamma \cdot (T_{gas} - T_R) \tag{4}$$

where
- $H_L$: heating value (Kcal/Nm³);
- $A_r$: air-fuel ratio;
- $T_{PRE}$: temperature (°C.) of preheated air;
- $T_R$: room temperature (°C.);
- $C_A$: specific heat of air (Kcal/Nm³ °C.)

- $\gamma$: heating value (Kcal/Nm³ °C.) of a unit of fuel at the change of temperature by a unit of exhaust gases;
- $T_{gas}$: temperature (°C.) of exhaust gases. Let $$Q_L(I) = Q_L$$

and substituting Eqs. (2)–(4) into Eq. (1), provides $$V = \frac{Q_o - Q_I + Q_L}{H_L + A_r(T_{PRE} - T_R)C_A - \gamma(T_{gas} - T_R)} \tag{5}$$

The efficiency of the exhaust heat recovery device (recuperator) 11 is represented by the following equation.

$$\eta = \frac{T'_{gas} - T_{gas}}{T'_{gas}} \tag{6}$$

wherein
$T'_{gas}$: gas temperature at the inlet to the recuperator. In this case, the temperature $T_{PRE}$ of preheated air may be expressed by the following equation as a function of $T_{gas}$.

$$T_{PRE} = \frac{\eta}{1 - \eta} \cdot C \cdot T_{gas} + T_R \tag{7}$$

where
C: a constant relating to the generation of exhaust gases. Substituting Eq. (7) into Eq. (5), we have $$V = \frac{Q_o - Q_I + Q_L}{C_1 + C_2 T_{gas}} \tag{8}$$

where $$C_1 = H_L + \gamma \cdot T_R \tag{9}$$

$$C_2 = A_r C_A \frac{\eta}{1 - \eta} C - \gamma \tag{10}$$

using Eq. (6), Eq. (8) may be expressed in the following equation (8)'.

$$V = \frac{Q_o - Q_I + Q_L}{C_1 + C_2(1 - \eta)T'_{gas}} \tag{8'}$$

In Eq. (8)' the latent heat $Q_o$ when the slab is discharged, the heat loss $Q_L$ of the furnace and the temperature of exhaust gases at the inlet to the recuperator $T'_{gas}$ can be uniquely determined once the temperature distribution in the furnace is determined. That is, Eq. (8) or Eq. (8)' is the equation showing the relationship between the furnace temperature distribution and fuel flow rate. As a result, for a given furnace temperature distribution, the magnitude of its corresponding fuel flow rate can be evaluated.

In general, various conditions are imposed upon the operation of heat furnaces. Eqs. (11)–(15) show examples of limiting conditions.

$$\bar{\theta}^{(1)}{}_{out} \leq \bar{\theta}_{out} \leq \bar{\theta}^{(2)}{}_{out} \tag{11}$$

$$\Delta\theta_{out} \leq \Delta\bar{\theta}^{(1)}{}_{out} \tag{12}$$

$$T_1 \leq T_{1MX} \tag{13}$$

$$T_2 \leq T_{2MX} \tag{14}$$

$$T_3 \leq T_{3MX} \tag{15}$$

where $\bar{\theta}_{out}$: average temperature of slab, $\bar{\theta}^{(1)}_{Out}$, $\bar{\theta}^{(2)}_{out}$: allowable minimum and maximum temperatures of slab, $\Delta\theta_{out}$: temperature difference between the surfaces and center of slab, $\Delta\bar{\theta}^{(1)}_{out}$: allowable error of said temperature difference, $T_1$, $T_2$, $T_3$: temperatures in the respective zones;

$T_{1MX}$, $T_{2MX}$, $T_{3MX}$: upper limits of temperatures in the respective zones.

$\bar{\theta}^{(1)}_{out}$, $\bar{\theta}^{(2)}_{out}$, and $\Delta\bar{\theta}^{(1)}_{out}$ are determined by the operativity or workability in rolling while $T_{1MX}$, $T_{2MX}$ and $T_{3MX}$ are determined by the capacity of the heat furnace. The furnace temperature pattern which satisfies the equations (11)–(15) as described above and makes fuel flow rate minimum is an optimum furnace temperature pattern.

Next referring to FIG. 2, the method for fuel minimization in accordance with the present invention will be described.

First, in step 201 N different sets of furnace temperature distributions $$II_i = (T_{1i}, T_{2i}, T_{3i})$$

are selected from the range wherein the limit condition equations (13)–(15) are satisfied. Next at step 202 the temperature of discharged slab $\bar{\theta}_{out}$ and the temperature difference $\Delta\bar{\theta}_{out}$ between the surfaces and center of the slab are computed for each of the furnace temperature distributions. Since [RENZOKU KOHEN KANETSURO NI OKERU DENNETSU JIKKEN TO KEISAN HOHO] (Experiments and Computations of Heat Transfer in Continuous Steel Slab Heating Furnaces) TOKUBETSU HOKOKUSHO NO. 11 (Special Report No. 11), SHADAN HOJIN NIPPON TETSUKKOU KYOKAI, Showa 46.5 describes that this computation is solved by the difference approximation of heat transfer equations, the computation method is not explained.

When the average temperature $\bar{\theta}_{out}$ of the discharged slab is obtained in the manner described above, the heat $Q_o$ (Kcal/H) in the case of the discharge of slabs can be obtained from the following equation.

$$Q_o = \bar{\theta}_{out} C_s \cdot M_s \tag{16}$$

where $C_s$: specific heat (Kcal/kg °C.) of slab, $M_s$: weight of slab (Kg).

And the heat loss in each furnace zone can be obtained from the following equation depending upon the temperature of this zone.

$$Q_L = \sum_{I=1}^{3} Q_L = \sum_{I=1}^{3} \{\alpha_I(T_I - T_R) + \beta_I\} \tag{17}$$

where $\alpha_I$ and $\beta_I$ are constants dependent upon the construction of a heat furnace and are previously determined. Furthermore $T'_{gas}$ °C. is a function $f(T_1)$ of the furnace temperature $T_1$ in the first zone (for instance $T'_{gas} = \xi T_1$, $\xi$: constant) and can be easily obtained when $T_1$ is determined. The values of these $Q_o$, $Q_L$ and $T'_{gas}$ are substituted in Eq. (8)' so that the fuel flow rate V (Nm³/H) for each of N sets of furnace temperature distributions under consideration is computed in step 203.

In step 204, of the V which have been obtained for each of N sets of patterns the maximum $V_{max}$ is selected, and in step 205 the furnace temperature distribution $II_A$ corresponding to $V_{max}$ which has been obtained in step 204 is corrected in the manner to be described below. That is, the center of gravity $II_c$ of the sets of (N-1) distributions except the furnace temperature distribution $II_A$ is obtained, and $II_A$ is changed to the next point $II'_A$. Let $$II_c = (T_{c1}, T_{c2}, T_{c3})$$

$$T_{ci} = \sum_{R=1}^{n} T_{ki}/N - 1$$

Then $$II'_A = II_c + (II_c - II_A) \cdot \partial \quad \partial = 1.3 \tag{18}$$

If the new furnace temperature distribution $II'_A$ fails to satisfy Eqs. (13)–(15), $II''_A$ which satisfies the conditions as described above can be obtained by decreasing the value of $\delta$. In step 206, next the temperature $\bar{\theta}_{out}$ of the discharged slab and the temperature difference $\Delta\bar{\theta}_{out}$ between the surfaces and center of the slab and the fuel flow rate V for the new furnace temperature distribution, or furnace temperature pattern are obtained in the manner described above. In step 207, it is checked whether or not the temperature of the discharged slab, temperature difference of the slab and furnace temperature distribution satisfy the conditions (11)–(15). If they fail, the furnace temperature distribution is corrected again in step 205 so as to satisfy these conditions. The re-correction is cycled until all the conditions (11)–(15) are established. Upon completion of this computation, the maximum flow rate of fuel is selected and its furnace temperature distribution is corrected. In this manner, the fuel flow rate is sequentially reduced and converges to an optimum value. That is, the standard deviation S of a set of N flow rates of fuel is obtained by the following equation, and when S becomes less than a preset value $\epsilon$, the flow rate of fuel is taken as being converged (step 208).

$$S = \frac{\sum_{I=1}^{N}(V_I - \bar{V})^2}{N} \tag{19}$$

$$\bar{V} = \frac{1}{N}\sum_{I=1}^{N} V_I \tag{20}$$

In this case, the number of N sets of furnace temperature patterns are averaged and provide an optimum pattern. In this manner, a furnace temperature pattern is determined which satisfies the slab discharging conditions as well as the furnace operation conditions and which reduces the fuel consumption to a minimum.

Figure 3:
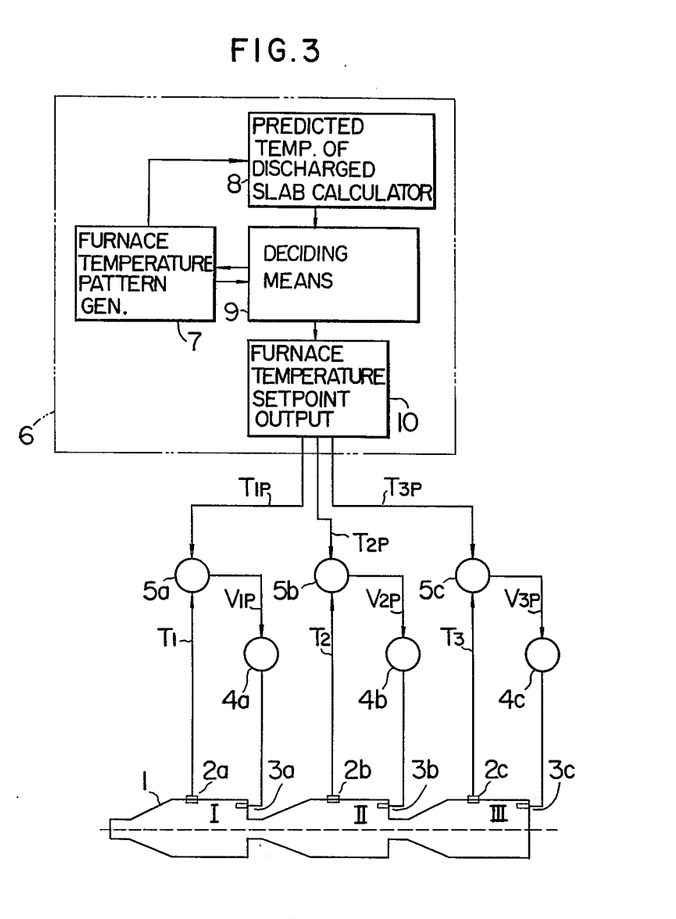
FIG. 3 is a schematic view of a three-zone heating furnace to which is applied a control method in accordance with the present invention.

Next referring to FIG. 3, the control method in accordance with the present invention will be described in conjunction with a three-zone reheat furnace. 1 is a three-zone heating furnace, and I is called a preheating zone, II called a heating zone, and III called a soaking zone. 2a-2c are temperature sensors respectively for respective zones; 3a-3c are burners in respective zones each for supplying the mixture of fuel and air to be burned; 4a-4c are means for controlling the flow rates of fuel; 5a-5c are furnace temperature control means. A furnace temperature setting means 6 in accordance with the present invention has a furnace temperature pattern generating means 7, a means 8 for computing an expected slab discharge temperature, a decision means 9 for making a decision whether or not a furnace temperature distribution or pattern generated by the furnace temperature pattern generating means 7 is an optimum furnace temperature pattern and a furnace temperature setting output 10 which outputs to the furnace temperature control means 5a-5c in terms of the furnace temperature setting values $T_{1p}$, $T_{2p}$ and $T_{3p}$ the furnace temperature pattern which is decided as an optimum by the decision means 9.

Figure 2:
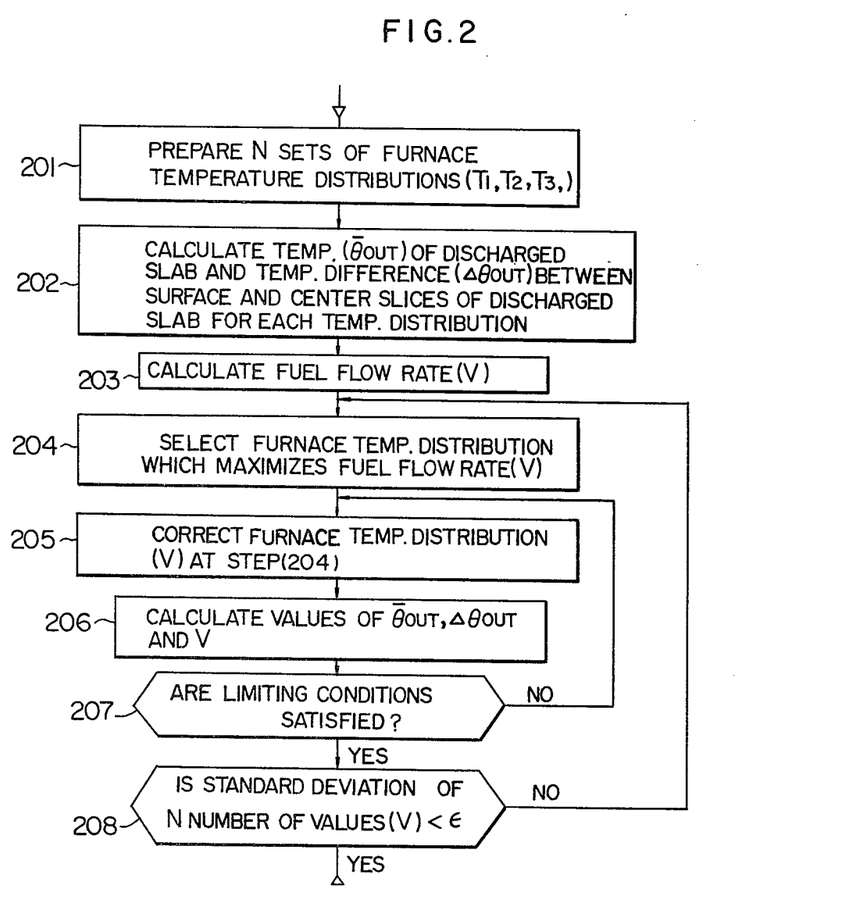
FIG. 2 shows a flow diagram for computing a furnace temperature pattern set point.

The furnace temperature setting means 6 accomplishes the processing in accordance with the flow chart shown in FIG. 2. In the furnace temperature setting means 6, when the heating conditions such as schedules of slab charging and discharging and thickness of slabs are changed, the computation for an optimum furnace temperature pattern for said heating conditions is effected. That is, the furnace temperature pattern generating means 7 generates a set of N different furnace temperature patterns $II_i$ (i=1~N) which are within the range which satisfies the furnace operation conditions (13)-(15). The slab discharging temperature computation means 8 receives these furnace temperature patterns as input and computes an average temperature $\bar{\theta}_{out}^{(i)}$ and a temperature difference $\Delta\bar{\theta}_{out}^{(i)}$ of the discharged slab for respective furnace temperature patterns. The decision means 9 receives as input the slab discharge temperature $\bar{\theta}_{out}^{(i)}$ and the temperature difference $\Delta\bar{\theta}_{out}^{(i)}$ which are computed by the computation means 8 for computing the expected temperature of discharged slab and receives as input the corresponding furnace temperature patterns $II_i$ from the furnace temperature pattern generating means 7 so as to compute the flow rates Vi of fuel based upon the equation (8)'. The deicision means 9 selects the furnace temperature pattern $II_j$ for the flow rate of fuel which becomes maximum among the number of N fuel flow rates Vi (i=1~N), and commands the furnace temperature pattern generating means 7 to correct the furnace temperature pattern $II_j$. In response to the command from the decision means 9, the furnace temperature pattern generating means 7 corrects the furnace temperature pattern based on the equation (18). However, this correction is carried out until the limit conditions (13)-(15) are satisfied. The slab discharge temperature computation means 8 computes the discharged slab temperature $\bar{\theta}_{out}^{(j)}$ and the temperature difference $\Delta\bar{\theta}_{out}^{(j)}$ for the corrected furnace temperature pattern. The decision means 9 receives as input these $II_i$, $\bar{\theta}_{out}^{(j)}$ and checks whether or not these values satisfy the limit conditions (11) and (12). If these values do not satisfy the limit conditions (11) and (12), the decision means 9 demands the furnace temperature pattern generating means 7 re-correction of the furnace temperature pattern. The furnace temperature pattern generating means accomplishes the fine correction of the furnace temperature pattern in the vicinity of $II_j'$, and the decision means 9 again checks whether or not the corrected discharge temperature $\theta_{out}^{(j)}$ and the corrected temperature difference $\Delta\theta_{out}^{(j)}$ satisfy the limit conditions (11) and (12). In this manner, the furnace temperature pattern generating means 7 generates new furnace patterns $II_j$ which are within the range in which the limit conditions (11)-(15) are satisfied. When the new furnace temperature pattern $II_j$ is selected, the decision means 9 obtains the flow rate $V_j$ of fuel which corresponds to the selected furnace temperature pattern, thereby forming pairs of the remaining (N−1) flow rates $V_i$ (i=1~N, i=j) of fuel. Next the decision means selects the maximum of the number of N sets of fuel flow rates and corrects again the furnace temperature pattern corresponding to it.

When the processing described above is repeated, the number of N flow rates of fuel converge to one value. In this case, the number of N furnace temperature patterns $II_i$ (i=1~N) approaches one furnace temperature pattern $II_p$, so that $II_p$ is decided as an optimum furnace temperature pattern. Whether or not the flow rates of fuel converge to a preset value is judged by whether or not the standard deviation S of the number of N flow rates of fuel which are expressed by Eq. (19) becomes less than a predetermined value $S_{min}$.

When the zone temperature set values $T_{1p}$, $T_{2p}$ and $T_{3p}$ which are determined in the furnace temperature setting means 6 are output to the furnace temperature control means 5a-5c as set values, the furnace temperature control means 5a-5c determine the set values $V_{1p}$, $V_{2p}$ and $V_{3p}$ of the flow rate of fuel depending upon the deviations betwween the zone temperatures $T_1$, $T_2$ and $T_3$ which are sensed by the furnace temperature sensors 2a-2c and the set values $T_{1p}$, $T_{2p}$ and $T_{3p}$. The set values are output to the fuel flow rate control means 4a, 4b and 4c as set values. The fuel flow rate control means 4a, 4b and 4c adjust the opening degrees of valves in a fuel supply system (not shown) in response to the respective set values, thereby changing the amounts of fuel to be supplied. Thus the temperatures in the respective zones are controlled to the values which are determined by the furnace temperature setting means 6.

According to the embodiment of the present invention which has been described so far above, slabs are heated under the furnace temperature pattern which satisfies the slab discharging conditions as well as the furnace operating conditions and which makes the fuel flow rate minimum.

Figure 4:
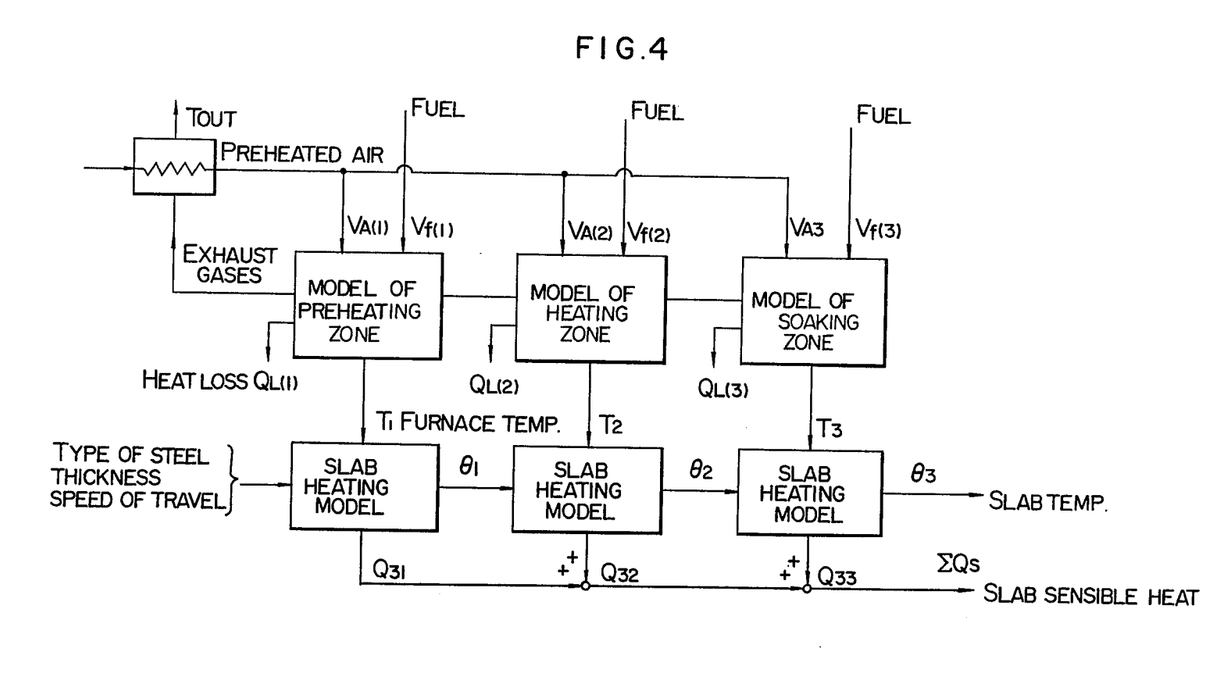
FIG. 4 is a schematic view showing the model of heat balance in a three-zone heating furnace.

The embodiment described above is related to the three-zone heating furnace, but the present invention is not limited to the three-zone heating furnace and can be equally applied regardless of the number of zones. In the above embodiment, the furnace temperature control method in accordance with the present invention has been explained in terms of the relationship between furnace temperature and flow rate of fuel. However, a predetermined releationship can be established between the furnace temperature and the slab temperature as will be described below, so that it is possible to control the flow rate of fuel by heating the slab in such a way that the slab temperature follows a temperature increase pattern. FIG. 4 shows the overall thermal balance in a heating furnace. $V_f(1)$, $V_f(2)$ and $V_f(3)$ are flow rates (Nm$^3$/H) of fuel supplied to the first, second and third zones; $V_A(1)$, $V_A(2)$ and $V_A(3)$ are flow rates (Nm$^3$/H) of air charged into the first, second and third zones; $Q_L(1)$, $Q_L(2)$ and $Q_L(3)$ are thermal losses (Kcal/H) escaping from the furnace walls and skids in the first, second and third zones, respectively; $\theta_1$, $\theta_2$ and $\theta_3$ are temperatures (°C.) of slabs discharged out of the first, second and third zones, respectively; $Q_s(1)$, $Q_s(2)$ and $Q_s(3)$ are latent heat (Kcal/H) of slabs discharged out of the first, second and third zones, respectively; $T_1$, $T_2$ and $T_3$ are furnace temperatures (°C.) in the first, second and third zones, respectively; and $T_{out}$ is a temperature (°C.) of exhaust gases. A predetermined relationship is established between the furnace temperature T and slab temperature $\theta$ by denoting the furnace temperatures $T_1$, $T_2$ and $T_3$ as T and the slab temperatures $\theta_1$, $\theta_2$ and $\theta_3$ as $\theta$ and solving the heat transfer equations by the difference approximations as described above. From this relationship, the heat to be transferred to the slab from the furnace can be expressed by the following equation.

$$Q_s = A[4.88\, \phi_{CG} \{ (\frac{T+273}{100})^4 - (\frac{\theta+273}{100})^4 \} + \alpha_c(T-\theta)] \quad (21)$$

where $\phi_{CG}$: overall heat absorptivity, $\alpha_c$: coefficient of heat transfer by convection (Kcal/m² H °C.), Qs: heat transferred to slab (Kcal/m² H), A: heat receiving surface area of slab (m²). Since Eq. (21) is held true in all zones, the total sum of Qs becomes equal to $(Q_o-Q_l)$ in Eq. (1). That is, $$Q_o - Q_l = \overset{n}{\Sigma} Q_s \quad (22)$$

where n: number of zones. By substituting Eq. (22) in Eq. (5), it becomes possible to determine an optimum slab temperature rise pattern.

Conversely, when the optimum furnace temperature Ti is determined and the time elapsed from the inlet to the respective zone to the present position of the slab is denoted by $\Delta\tau$, the latent heat of the slab after $\Delta\tau$ is expressed by the following equation by the application of Eq. (21).

$$H_o = H_i + \frac{\Delta\tau}{\rho h} Q_s \quad (23)$$

where h: thickness of slab (m);

Ho: latent heat of the slab at the outlet of each zone (Kcal/kg);

Hi: latent heat of slab at the inlet to each zone (Kcal/kg).

The average temperature $\theta$ of the slab is expressed by the following equation.

$$\theta = \frac{H_o}{C_m} \quad (24)$$

where

Cm: specific heat of slab (Kcal/kg °C.)

Therefore an optimum furnace temperature pattern for a slab may be obtained from Eq. (24). It is preferable in view of the limitations imposed upon the discharge temperature that after the slab has been charged into the heating furnace, the temperature control is effected by controlling the furnace temperature based upon the slab temperature rise pattern which is obtained in the manner described above. Therefore the method for dynamically controlling the furnace temperature based upon an optimum slab temperature rise pattern will be described hereinafter.

Figure 5:
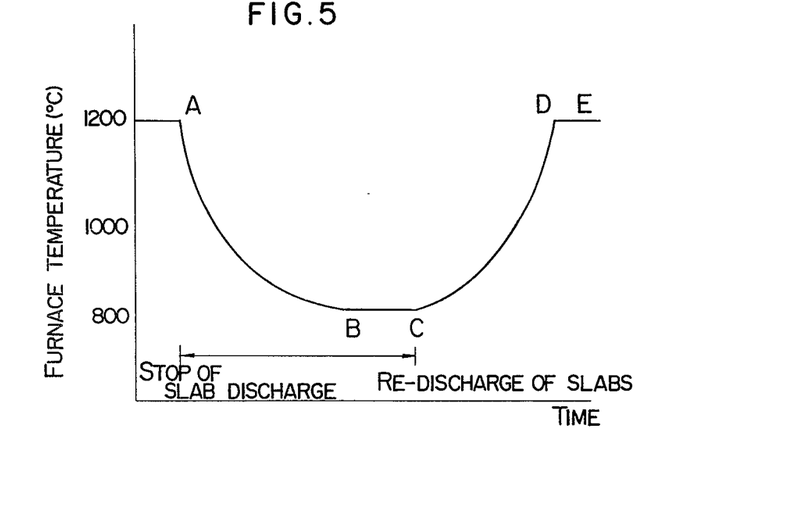
FIG. 5 is a graph of furnace temperature which is used in a prior art furnace temperature control in the case of the suspension of slab discharge.

FIG. 5 shows one example of the furnace temperature control methods which have been employed so far in the case of the suspension of a rolling line (Iron and Steel Engineer, Sept. 1972, P43-56). When the rolling line is suspended, the furnace temperature set point is once lowered so that the temperature of a slab sensed by a radiation type temperature sensor disposed in the vicinity of the discharge outlet of the furnace, the sensor detecting the slab temperature immediately below it, may be maintained at a constant level (ABC in FIG. 5). When the rolling is started again prior to re-discharging of the slab, the furnace temperature control for heating the slab to a desired discharge temperature is started and the furnace temperature is recovered to the temperature prior to the suspension (CDE in FIG. 5). However such method has the following defects or problems; (i) the temperature of the slab disposed immediately below the temperature sensor may be maintained constant, but other slab temperatures change during the suspension; that is, when slab discharge is started again, other slabs are overheated or underheated so that there is a tendency that the discharge precision of the slab temperature is lowered after the charging has been started again; (ii) since the furnace temperature control is started after the operation of the rolling line has been started again, it takes a time before it is heated to a set point so that the starting of rolling is delayed and consequently productivity is lowered; (iii) in general, the heating furnace has a plurality of zones, and the temperatures in the respective zones may be operated independently. However, there is left a problem how to set the temperatures in the respective zones and control them. Unless this problem is solved, the furnace temperature control in the case of the suspension of the rolling line goes wrong.

Figure 6:
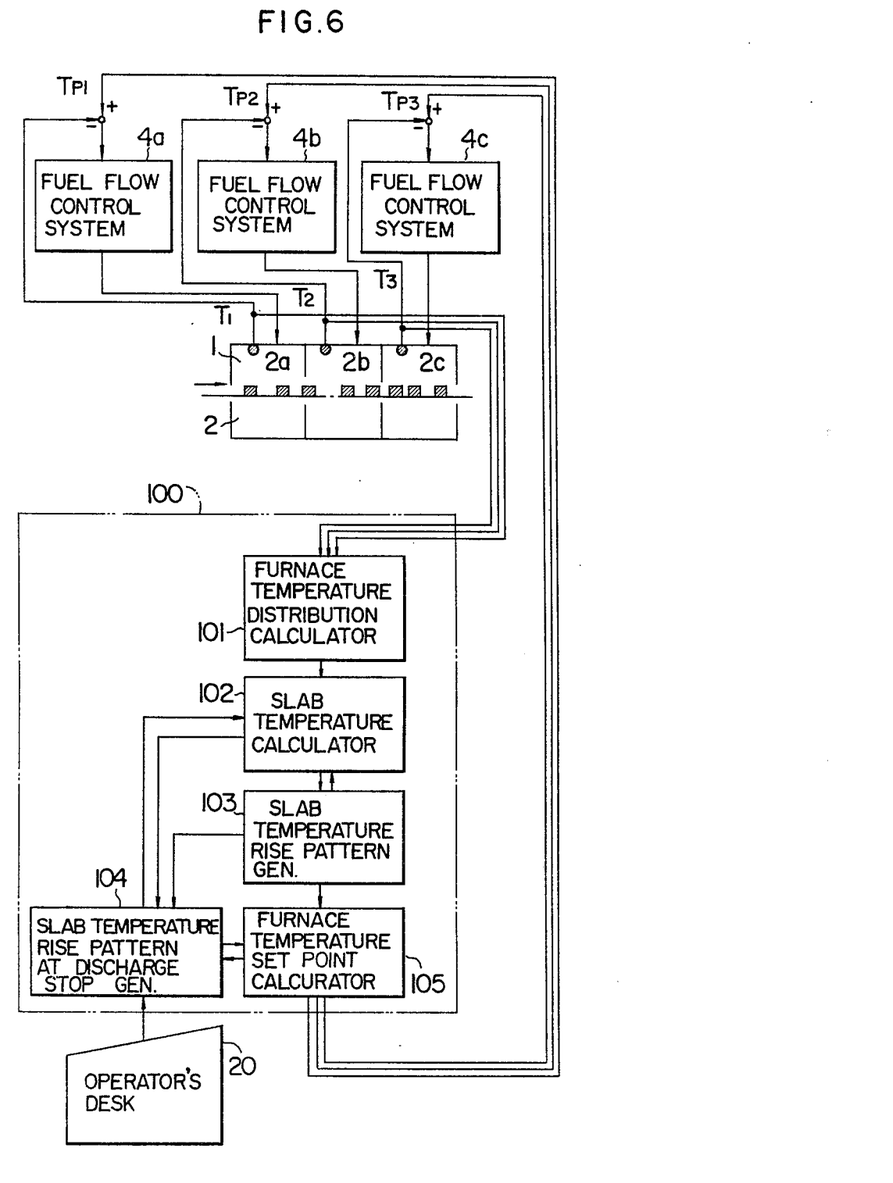
FIG. 6 is a schematic view of a three-zone heating furnace to which is applied a furnace temperature control method in accordance with the present invention.

FIG. 6 shows a three-zone heating furnace 1 to which is applied the furnace temperature control method of another embodiment of the present invention. The heating furnace 1 has a preheating zone, heating zone and soaking zone and heats slabs 2 therein. The furnace temperatures in the respective zones are detected by means of temperature sensors 2a, 2b and 2c. The flow rates of fuel supplied to the respective zones are controlled by control means 4a, 4b and 4c. In response to the conditions (for instance, rolling troubles, suspension of rolling) of a rolling line or to a production schedule, an operator instructs the suspension of the slab discharge to a combustion control computer 100 through an operating desk 20. The combustion control computer 100 has a unit 101 for computing the temperature distribution within the heating furnace 1, a unit 102 for computing the slab temperature within the heating furnace 1, a slab temperature rise pattern generating unit 103, a suspension temperature rise pattern generating unit 104 and a unit 105 for computing a furnace temperature set point. The furnace temperature distribution computation unit 101 receives as input the furnace temperatures $T_1$, $T_2$ and $T_3$ which are detected by the furnace temperature sensors 2a, 2b and 2c, respectively, in the respective zones, and effects the filtering treatments of the furnace temperatures in order to remove detection noise. For the sake of simplicity, let $T_1$, $T_2$ and $T_3$ are substituted by $T_0$, and the filtering treatments are effected. Then the new furnace temperature T is expressed by the following equation.

$$T = \alpha T^{(-1)} + (1-\alpha)T_0 \quad (25)$$

where
- a: filtering constant (In general, value of the order of 0.7 is used),
- $T^{(-1)}$: the furnace temperature after the previous filtering treatment.

As $T_0$, the furnace temperatures $T_{1-3}$ measured in the respective zones are subjected to the filtering treatments. In the following description, the furnace temperature refers to the furnace temperature which has been subjected to the filtering treatment as described above. The slab temperature computation unit 102 computes the present slab temperature based upon the thermal conduction computation within the slab and with the slab temperature in the previous computation as a starting point. The thermal conduction within the slab can be expressed by a three-dimensional partial differential equation, but it is known in the report published by Nippon Tekko Kyokai that the slab temperature can be computed by one-dimensional difference equations such as equations (26), (27) and (28) to such a degree of precision which is not objectional in practice as described above. When a slab is divided into m slices in the direction of its thickness, the interior temperature $\theta'_n$, upper surface temperature $\theta'_1$ and bottom surface temperature $\theta'_m$ of the slab may be expressed by the following equations.

$$\theta'_n = \theta_n + \frac{k\Delta\tau}{c \cdot \rho \cdot \Delta x^2}(\theta_{n-1} + \theta_{n+1} - 2\theta_n) \qquad (26)$$

where n: 2 (m-1)

$$\theta'_1 = \theta_1 + \frac{2k \cdot \Delta\tau}{c \cdot \rho \cdot \Delta x^2}(\theta_2 - \theta_1) + \frac{2\Delta\tau}{c \cdot \rho \cdot \Delta x^2} Q \qquad (27)$$

$$\theta'_m = \theta_m + \frac{2k \cdot \Delta\tau}{c \cdot \rho \cdot \Delta x^2}(\theta_{m-1} - \theta_m) + \frac{2 \cdot \Delta\tau}{c \cdot \rho \cdot \Delta x^2} Q \qquad (28)$$

Eq. (26) represents the interior temperature of the slab; Eq. (27) represents the upper surface temperature of the slab; and Eq. (28) represents the bottom surface temperature of the slab.

- m: total number of divisions in the direction of the thickness of the slab;
- $\theta_n$: temperature (°C.) of the divided point n before $\Delta\tau$ time;
- $\theta'_n$: present temperature of the divided portion n (°C.);
- k: thermal conductivity (Kcal/m H °C.);
- c: specific heat (Kcal/kg °C.);
- $\Delta x$: distance between the divided portions, m;
- $\rho$: specific weight Kg/m²

$$Q = 4.88 \, \phi_{CG}[(\frac{T+273}{100})^4 - (\frac{\theta k + 273}{100})^4]$$

$$k = 1 \text{ or } m$$

$\phi_{CG}$: overall heat absorption coefficient.
where $\theta$ is heat transferred from the furnace to the slab. Assume that the slab temperature be computed at a certain time. In order to obtain the temperature after a time interval $\tau$, this time interval is divided by $\Delta\tau$ from said certain time and the computation of the temperature rise during the time interval $\tau$ is carried out. That is, the slab temperature after $\tau$ may be obtained by the computations of $N=\tau/\Delta\tau$ times. Let the computation interval $\tau_o$ of the slab temperature. Then the present slab temperature can be obtained by the computation of $\tau_o/\Delta\tau$ times with the previous slab temperature being a starting point. When the present slab temperature is computed, the slab temperature after a predetermined time interval can be predicted easily. In order to predict the slab temperature after a time interval $\tau_p$, the slab temperature can be obtained by the computation of $\tau_p/\Delta\tau$ times when the slab is heated at the average furnace temperature of $T_F$ for a time interval $\tau_p$. Therefore in order to heat the slab to a desired temperature after a time interval $\tau_p$, it suffices to predict the temperature after $\tau_p$ by varying the furnace temperature $T_P$ many times so as to obtain the furnace temperature $T_F$ which results in a slab temperature most close to a set point and to set this temperature as a new furnace temperature. This will be described in more detail hereinafter. The processing in the slab temperature rise pattern generating unit 103 comprises the steps of predicting a time of passage, or a time interval during which a slab stays in the furnace (to be referred to as "a heating time") when this slab is charged into it, and selecting among previously preparted standard temperature rise patterns one pattern which corresponds to the predicted heating time. The prediction of the heating time is carried as follows. Assume that two slabs are continuously discharged out of the heating furnace. Then the time interval $\tau_M$ from the time when the preceding slab has been rolled to the time when the succeeding slab has been rolled can be expressed by the following equation.

$$\tau_M(i) = \tau_R(i) + \tau_P(i) \qquad (29)$$

where
- $\tau_R(i)$: predicted value of rolling time of the slab which is located in the furnace at the i-th from the discharge opening;
- $\tau_P(i)$: rolling interval between continuous workpieces to be rolled. The rolling time prediction value $\tau_R(i)$ is determined by the size of a slab so that the rolling time of each slab can be determined by the previous computation of the relationship between the size of a slab and the rolling time when the slab is charged into the furnace. TABLE 1 shows one example of the size and rolling time of slabs. Meanwhile the intermission time $\tau_P(i)$ between the workpieces to be rolled is determined depending upon a production schedule. That is, given the production T/H or ton per unit time of a series of slabs $\tau_P(i)$ is expressed by the following equation.

TABLE 1

Relationship between size and rolling time of slabs

| Size (m) | | |
|---|---|---|
| Length | Thickness | Rolling Time (minutes) |
| 6 | × 0.2 | 1.5 |
| 6 | × 0.25 | 1.8 |
| 6 | × 0.30 | 2.1 |
| 8 | × 0.2 | 2.0 |
| 8 | × 0.25 | 2.4 |
| 8 | × 0.30 | 2.7 |

$$\tau_P(i) = W_i/(T/H) - \tau_R(i) \qquad (30)$$

where
- $W_i$: weight (kg) of slab i. Furthermore, in the case of the periodic changes of rolling rolls, slab discharge is stopped so that such periodic suspension time is added to or substituted into $\tau_P(i)$. When $\tau_M(i)$ is computed for a slab in the furnace in the manner described above, a heating time R of a newly charged slab may be obtained from the following equation.

$$R = \sum_{i=1}^{N} \tau_M(i) \tag{31}$$

where

Figure 7:
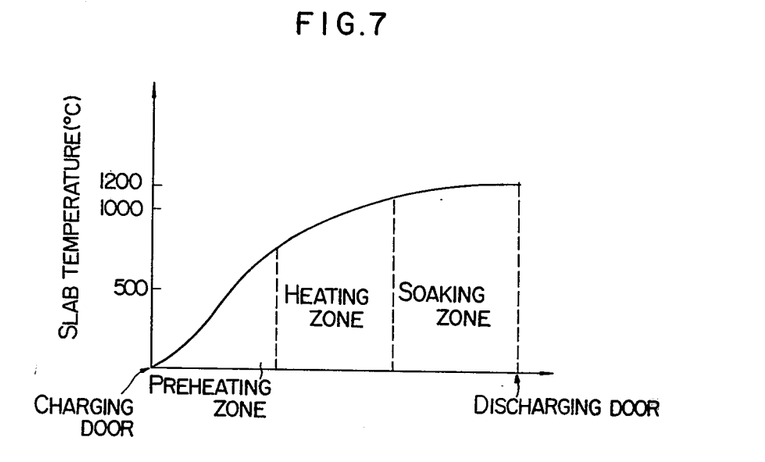
FIG. 7 is a graph showing slab temperature rise pattern.

N: number of slabs which are scheduled to be discharged out of the furnace prior to the charging of a new slab. Next the temperature rise pattern selection is carreid out in the manner to be described below. The temperature rise pattern is a slab temperature rise pattern for heating a slab to a set discharge temperature for a length of heating time with a minimum quantity of fuel when a heating time of the slab and the set discharge temperature of the slab are given. The decision of the temperature rise pattern is made in a trial and error method in an actual furnace. As with the embodiment described above, based upon the combustion model of a furnace, the furnace temperature pattern which results in a minimum flow rate of fuel is determined, and the temperature rise pattern is determined in the form of slab temperature rise curve when the heating furnace is operated according to this furnace temperature pattern. FIG. 7 shows a temperature rise pattern when a body of soft steel is heated to 1250° C. for three hours. This temperature rise pattern is stored in the slab temperature rise pattern generating unit 103 as function of position in the furnace. That is, the heating furnace is equally divided, and the slab temperatures on the divided points are obtained from FIG. 7 and stored. Various slab temperatures obtained depending upon the combinations of set discharge temperature, heating time and kinds of steel are prepared as table. Alternatively, it may be possible to incorporate the above temperature rise pattern computation unit into an on-line computer so that the temperature rise pattern is computed immediately before a slab is charged and the slab temperatures at the divided points are stored in the slab temperature rise pattern generating unit 103.

Next the processing in the furnace temperature set point computation unit 105 is carried out in the following manner. In the furnace temperature set point computation unit, first the position of a slab after a predetermined time $\tau_P$ is obtained. The temperature of the temperature rise pattern at this position is obtained and is set as set point temperature $\hat{\theta}$ of the slab. Furthermore the temperatures $\hat{\theta}$ of the respective slabs after $\tau_P$ time are predicted in the slab temperature computation unit 102 on the assumption that the present furnace temperature be maintained. Next in the furnace temperature set point computation unit 105, the following evaluation functions for respective zones are computed.

$$J = \sum_{i=1}^{N_I} W_i \cdot (\hat{\theta}(i) - \hat{\theta}_P(i))^2 \tag{32}$$

$$A = \sum_{i=1}^{N_I} W_i \cdot (\hat{\theta}(i) - \hat{\theta}_P(i)) \tag{33}$$

where $N_I$: number of slabs in each zone;
W: weighting function. The weighting function Wi is determined depending upon the position of the slab within the zone. In general, it is frequently desired that the temperature of the slab in the vicinity of the discharge side of the zone be more closer to a set point than the temperature of the slab at the entrance to the zone. Therefore the weighting function is determined in such a way as to increase from the entrance to the exit. The evaluation function J is a quantity which represents the magnitude of deviation from a set point of the slab within the zone after $\tau_P$ time. The evaluation function A is a quantity which represents whether the deviation is toward the positive or negative direction. When J is greater than a previously selected quantity $\epsilon$, the furnace temperature $\hat{T}'$ which is used in the prediction computation is corrected by the following equations.

$$\hat{T}' = \hat{T} - \Delta T (A < 0)$$
$$\hat{T}' = \hat{T} + \Delta T (A \geq 0) \tag{34}$$

Next, the expected slab temperatures are obtained again as furnace temperature $\hat{T}'$ used in the prediction computation, and J and A are computed. When such process are repeated so that J becomes less than $\epsilon$, the furnace temperature $\hat{T}'$ is decided as optimum value of the furnace temperature from the present time to a time point after $\tau_P$.

Next the processing in the combustion control computer 100 is carried out in the manner to be described below when there is a stop command of an operator. In this case, it does not necessarily follow that the discharge of slabs from the furnace be immediately stopped. In general, discharge stop is previously instructed in such a way that when a slab which is scheduled to be discharged out of the furnace reaches the exit, the discharge of this slab is stopped. Therefore when the suspension of the slab discharge or the suspension schedule is input through the operation desk 20 to the computer 100, the information that the discharge is suspended when which of the slabs in the furnace is discharged and how long the discharge is suspended is instructed.

When such instruction or command is given by the operator, the suspension temperature rise pattern generating unit 104 inputs this suspension time and a slab No which starts the suspension.

When the suspension of the rolling line or the suspension schedule is keyed-in by the operator, the processing in the suspension temperature rise pattern generating unit 104 is carried out in the following manner. When rolling suspension (schedule) is keyed-in from the operator operation desk 20, the heating time of the slab becomes longer by a suspension time. When the slab is heated under the present conditions, overheating results with the resultant cause for loss of energy. Therefore the furnace temperature must be lowered. Furthermore, in order to effecting smoothyl the heating after the discharge of slabs has been resumed, it is preferably that when resumed, the slab temperature is recovered to the conditions immediately before the suspension.

According to the present invention, when the slab discharge suspension (or suspension schedule) is keyed-in, the flow rate of fuel to the heating furnace is throttled and is returned to a high level again at a certain timing based upon a predicted value of the furnace temperature so that the slab temperature is controlled to a value immediately prior to the suspension when the discharge is resumed.

Figure 8:
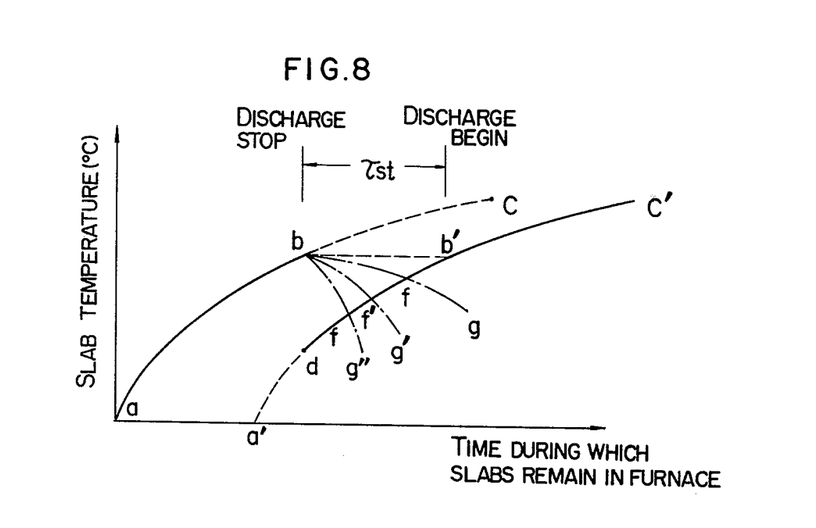
FIG. 8 is a graph of slab temperature rise patterns which are used in the furnace temperature control in the case of the suspension of slab discharge.

FIG. 8 shows the slab temperature rise curve relative to the heating time. The curve a→b→c shows the slab temperature rise pattern before the discharge suspension (or suspension schedule) is keyed in from the operator's operation desk 20. And the curve a'→b'→c' indicates the imaginary temperature rise pattern after the discharge suspension. Assume that the slab temperature rise is effected along the curve a→b→c after the resumption of the slab discharge. Then, when the discharge suspension instruction is input at the point b on the curve a→b→c, the slab is heated up along the curve b'→c' which is obtained by shifting the curve a→b→c by $\tau_{ST}$ when the discharge is resumed. When the discharge is suspended at the point b on the curve a→b→c, the temperature set point of the slab is lowered to a value along the curve d→b'→c' so that the flow rate of fuel for combustion purpose is throttled. As a result, the slab temperature is lowered along one of the curves b→f→g, b→f'→g', b→f''→g'' and so on. In this case, the degree of throttling the flow rate of fuel; that is, lowering of the furnace temperature is different from one zone to another. That is, in the soaking zone, the slab is already in the uniformly heated state so that the furnace temperature is not varied over a wide range, but in the preheating zone the difference between the slab temperature and the furnace temperature is greater so that the loss of heat escaping through a stack to the outside is great. As a consequence, it is preferably from the energy saving view point to lower the furnace temperature when the discharge is suspended. Therefore the slab temperatures are lowered along different lowering curves in the respective zones. Prior to the resumption of the slab discharge, the slabs are heated from the intersections f, f' and f'' of said lowering curves and the imaginary temperature rise pattern a'→b'→c' along the curve a'→b'→c'. When the discharge is resumed, the slab temperatures at the points b and b' are the same.

Figure 9:
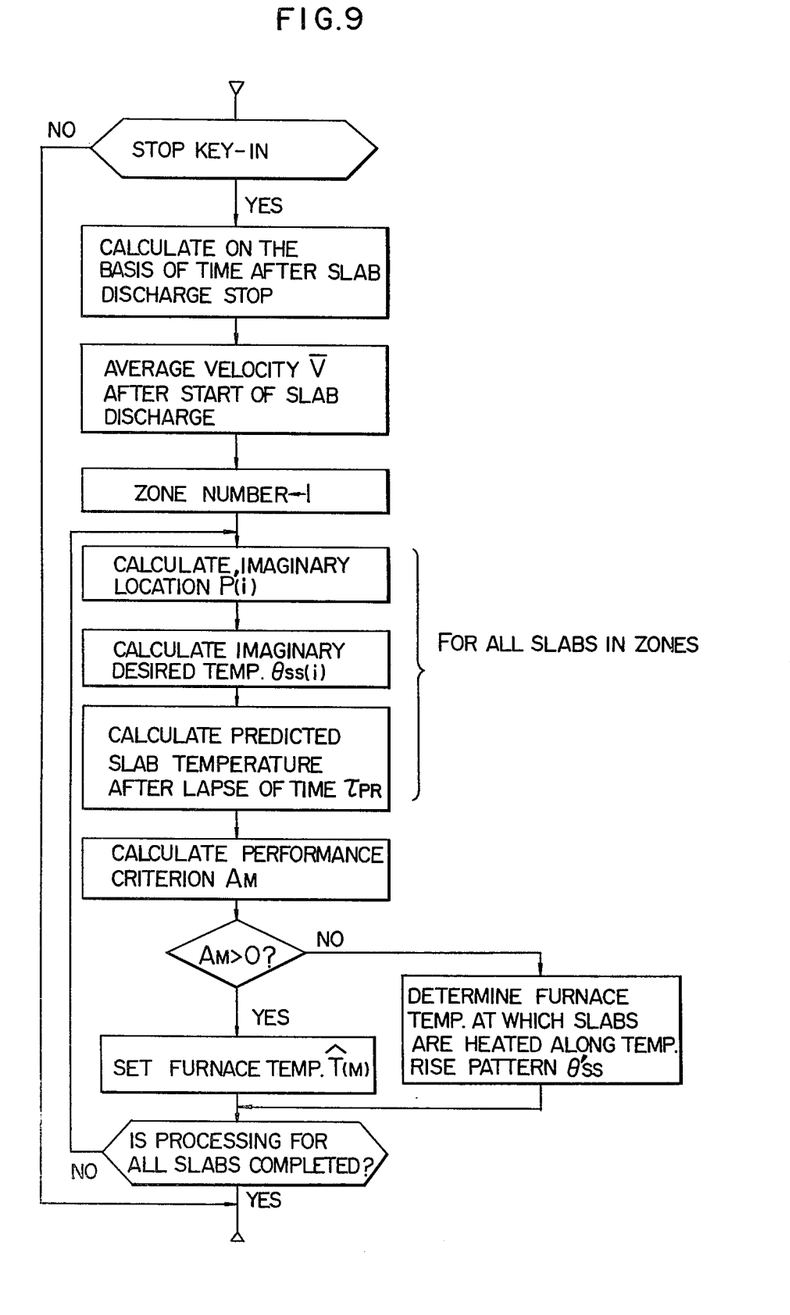
FIG. 9 shows a furnace temperature control algorithm used in the case of the suspension of slab discharge.

The suspension temperature rise pattern computation unit 104 carries out said processing according to the processing flow shown in FIG. 9.

First, when the suspension is keyed-in, the average velocity $\overline{V}$ of slabs in the furnace after the resumption of the discharge is obtained by the following procedure. Let I denote the slab located most close to the exit when slab discharge is suspended. A time interval $\tau_K(I)$ from the time of the discharge of the slab I to a time when the slab located at the k-th from the slab I is discharged is computed by the following equation.

$$\tau_K(I) = \sum_{j=1}^{k} \tau_M(j) \qquad (35)$$

where $\tau_M(j)$ is the discharge time pitch associated with the j-th slab from the slab I. Let Ko denote the slab when the $\tau_K(I)$ is most close to the suspension time $\tau_{ST}$. The relative distance $X_L$ between the slabs I and Ko in the furnace may be easily computed fom the following equation.

$$X_L = |P(I) - P(Ko)| \qquad (36)$$

where P(j) is the distance in meters between the exit and the j slab. Therefore the average value $\overline{V}$ of the tracking velocity in the furnace after the resumption of the discharge can be obtained from the following equation.

$$V = X_L / \tau_K(I) \qquad (37)$$

When the discharge suspension schedule is instructed, it is the slabs to be discharged subsequent to the indicated slab that are influenced by the suspension. Therefore the change of the temperature rise pattern to be described below is effected only for the slabs subsequent to the indicated slab.

It is assumed that during the suspension period $\tau_{ST}$ the slab is moved in the furnace at said velocity $\overline{V}$ to the present position when the discharge is resumed. Then each slab is located closer to the entrance by $X_L$ when the suspension is started than the present position. The imaginary displacement during the discharge suspension is called the imaginary movement. Let $\tau_{ss}$ denote time interval after the discharge suspension. Then the imaginary position of the slab which is the position spaced apart by P(i) from the entrance; that is, the imaginary distance P'(i) is obtained from the following equation.

$$P'(i) = P(i) + (\tau_{ST} - \tau_{ss}) \cdot \overline{V} \quad 0 \leq \tau_{ss} \leq \tau_{ST} \qquad (38)$$

As described above, the slab temperature rise pattern is given as function of the position in the furnace so that the slab temperature rise pattern during the discharge suspension corresponding to this imaginary position can be determined. This temperature rise is called imaginary temperature rise. According to the concept of the imaginary movement, the slab reaches the present position P(i) when the discharge is resumed, so that when the discharge is resumed, the slab heating conditions prior to the discharge suspension can be reproduced by heating the slab along the imaginary temperature rise curve during the discharge suspension.

The imaginary temperature set point $Q_{ss}(i)$ of the i-th slab after the time period $\tau_{ss}$ from the discharge suspension is given by the following equation.

$$Q_{ss}(i) = f[P'(i)] \qquad (39)$$

During the discharge suspension period, the processing in the furnace temperature set point computation unit 105 is carried out in the following manner.

First, as in the case of the steady state, the computation for predicting the slab temperature $\tau_{PR}$ after the discharge suspension is carried out with the suspension (or suspension schedule) instruction input. However, the following value $\hat{T}(M)$ is used as the M-th zone temperature after the prediction time $\tau_{PR}$.

$$\hat{T}(M) = To(M) - \Delta T(M) \qquad (40)$$

where
To(M): furnace temperature (°C.) immediately before the discharge suspension;
To(M): corrected value (a constant value) of the furnace temperature (°C.). Furthermore in the respective zones, the following average value $A_M$ is computed with $\hat{\theta}(i)$ being as predicted value of the i-th slab temperature.

$$A_M = \frac{\sum_{i=1}^{N_M} (\hat{\theta}(i) - Q_{ss}(i))}{N_M} \qquad (41)$$

where

N$_M$: number of slabs in the M-th zone. A$_M$ is an index representing whether the predicted temperatures of all slabs in the M-th zone are above or below as a whole the imaginary temperature rise pattern.

As far as A$_M$ is positive, the furnace temperature set point is fixed to $\hat{T}(M)$ (M = 1, ..., 4). Since the furnace temperature $\hat{T}(M)$ is constant, the furnace temperature control for correcting the slab temperature is in fact suspended. When A$_M$ becomes zero or negative, the furnace temperature control is so effected as to heat the slab along the temperature rise pattern $Q_{ss}(I)$. This control system is the same with the processing in the furnace temperature set point computation unit 105 prior to the suspension operator's key-in. Because of the furnace temperature control the furnace temperature rises again so that when the discharge is resumed, the slab temperature reaches a set temperature immediately before the discharge suspension.

After the discharge has been resumed, the original control for heating along the temperature rise pattern is executed.

Figure 10A:
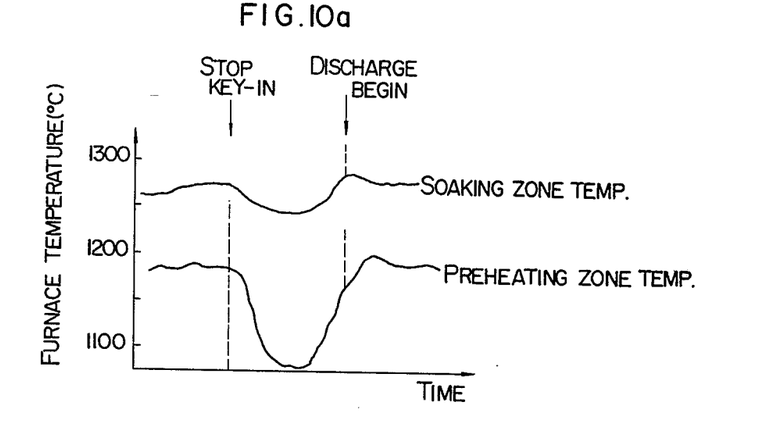
FIGS. 10a, 10b and 10c are graphs showing the furnace temperature, slab discharge temperature and fuel flow rate, respectively, in the case of the suspension of slab discharge from the furnace.
Figure 10B:
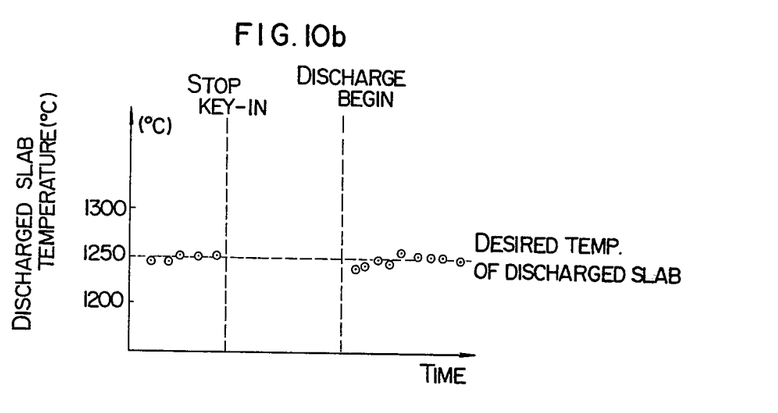
Figure 10C:
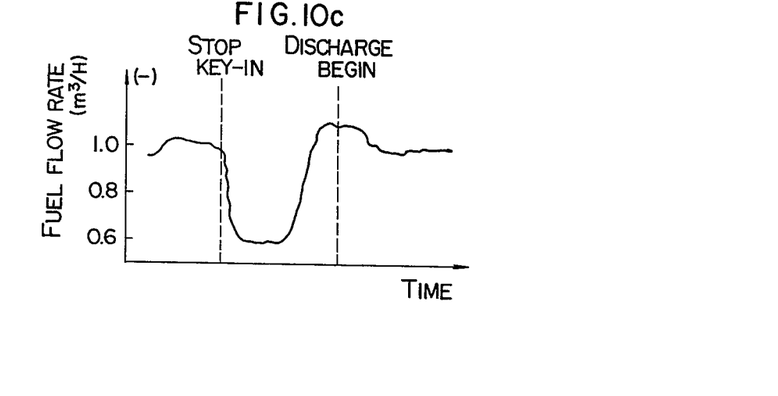

The effects of the embodiment described above are shown in FIGS. 10a, 10b and 10c. In the figures, part of the response of the furnace is shown when a trouble occurs in the rolling line so that the operator inputs the emergency discharge suspension instruction. FIG. 10a shows the variation in furnace temperature in the preheating zone and soaking zone. FIG. 10b shows the temperature of the discharged slab. FIG. 10c shows the whole fuel supplied to the furnace in terms of the ratio with respect to the value immediately prior to the discharge suspension. With the suspension key-in, the flow rate of fuel is drastically reduced and consequently the furnace temperature drops gradually. Prior to the discharge resumption, the flow rate of fuel is rapidly increased and the furnace temperature is recovered. It is seen that the slab discharge temperature after the resumption of slab discharge is slightly lower than a set point or substantially equal to a set point. As described above, according to the present invention it should be noted that it is possible to carry out the stable furnace operations even when the operator inputs the discharge suspension (or discharge schedule) so that the scheduling of the discharge is changed. Furthermore, according to the present invention, the flow rate of fuel can be economized during the suspension period of slab discharge, and the slab discharge temperature may be controlled with an extremely higher degree of accuracy.

What is claimed is:

1. For use with a multi-zone heating furnace having a plurality of zones, zone temperature sensors for sensing the zone temperatures, zone temperature control means for controlling the zone temperatures based on deviations of the output signals of the zone temperature sensors from set values of the zone temperatures, fuel flow rate control means for controlling flow rates of fuel supplied to burners in the respective zones in response to the output signals of the zone temperature control means, a method of controlling furnace temperatures comprising the steps of:
   (a) computing flow rates of fuel in a plurality of slab temperature rise patterns in which at least one of slabs to be charged into the furnace or remaining in the furnace will be heated to a predetermined slab temperature at discharge;
   (b) selecting a slab temperature rise pattern which results in the minimum one of the fuel flow rates computed in the preceding step;
   (c) predicting a desired discharge temperature of a slab at a predetermined later time from the present point of time based on the slab temperature rise pattern selected in the preceding step;
   (d) performing prediction computation of a slab temperature at a predetermined later time based on the slab temperature at the present point of time;
   (e) finding a deviation between the desired discharge temperature predicted in step (c) and the slab temperature computed in step (d);
   (f) correcting a set point temperature of an associated zone based on the deviation in temperature obtained in step (e); and
   (g) controlling the associated zone temperature so as to cause same to correspond to the set point temperature thus corrected.

2. A method as claimed in claim 1, wherein the step of correcting the set point temperature of the associated zone comprises a further step of correcting the set point temperature of the zone based on the average of the deviations in temperature.

3. A method as claimed in claim 1, wherein the step of correcting the set point temperature of the associated zone comprises a further step of correcting the set point temperature of the zone based on the sum of squares of the deviations in temperature.

4. A method as claimed in claim 1, wherein the step of correcting the set point temperature of the associated zone comprises further steps of:
   (a) determining a polarity based on the sign of the average value of the deviations in temperature which polarity is used to correct the set point temperature of the associated zone; and
   (b) correcting the set point temperature of the associated zone by a predetermined correction value of zone temperature depending upon the sing thus determined.

5. A method as claimed in claim 1, wherein the step of computing flow rates of fuel in a plurality of slab temperature rise patterns comprises the steps of:
   (a) computing in response to the respective temperature rise patterns at least one of latent heat ($Q_O$) of discharged slab, waste gas temperature ($T_{gas}$) and thermal losses ($Q_L$) escaping from the furnace walls and skids, and
   (b) computing flow rates of fuel as a function of the value thus computed.

6. A method as claimed in claim 1, where the step of selecting a slab temperature rise pattern comprises the steps of:
   (a) computing flow rates of fuel in a plurality of furnace temperature patterns and selecting the furnace temperature pattern which corresponds to the maximum one of the flow rates of fuel thus computed;
   (b) determining a new furnace temperature pattern which reduces the computed value of fuel flow rate in the furnace temperature pattern thus selected;
   (c) computing flow rates of fuel in a plurality of furnace temperature patterns including the new one thus determined; and
   (d) selecting a furnace temperature pattern corresponding to the minimum one of the fuel flow rates by repeating the steps (a) to (c).

7. A method as claimed in claim 1, wherein when slab discharge is interrupted for a period or periods of time a furnace temperature set point control is performed by the steps of:
  (a) setting a new slab temperature rise pattern such that a slab temperature at suspension of slab discharge in a predetermined slab temperature rise pattern can be againrealized in the new slab temperature rise pattern at resumption of slab discharge;
  (b) setting a transfer curve extending from the slab temperature at suspension of slab discharge in the predetermined slab temperature rise pattern of step (a) to the newly set slab temperature rise pattern in such a manner that the flow rate of fuel becomes minimum; and
  (c) effecting slab temperature rise along the set transfer curve and thence along the newly set slab temperature rise pattern to thereby perform furnace temperature control in accordance with the newly set slab temperature rise pattern.

8. A method as claimed in claim 7, further comprising the step of reducing the flow rate of fuel by a predetermined quantity set for each of the zones at suspension of slab discharge.

9. A method as claimed in claim 6, wherein said step for determining the new correction slab temperature rise curve includes the steps of:
  (a) computing an average tracking velocity after the resumption of the slab discharge;
  (b) computing an imaginary displacement over which a slab reaches to the present position at said average tracking velocity for a scheduled discharge suspension period set by an operator;
  (c) computing an imaginary slab temperature set point at a point spaced toward the inlet of said furnace from said present position by said imaginary displacement; and
  (d) generating a slab temperature set point in such a way that as time elapses after the input of said scheduled discharge suspension period, the slab is heated from said imaginary slab temperature set point to the set point at the present position.

10. A method as claimed in claim 1, wherein in step (d) the temperatures of a plurality of portions obtained by dividing the slab in the direction of its thickness in the preceding computation are used as initial values for computing temperatures of the slab portions at the present point of time, and the average of the temperatures of the slab portions is used as the slab temperature of the slab.

11. A method as claimed in claim 1, wherein the step (a) comprises the steps of selecting at least a predetermined slab or slabs for each of the zones, and computing flow rates of fuel in a plurality of slab temperature rise patterns in which the selected slab or slabs will be heated to a predetermined slab temperature at discharge.

* * * * *